Patented Feb. 20, 1923.

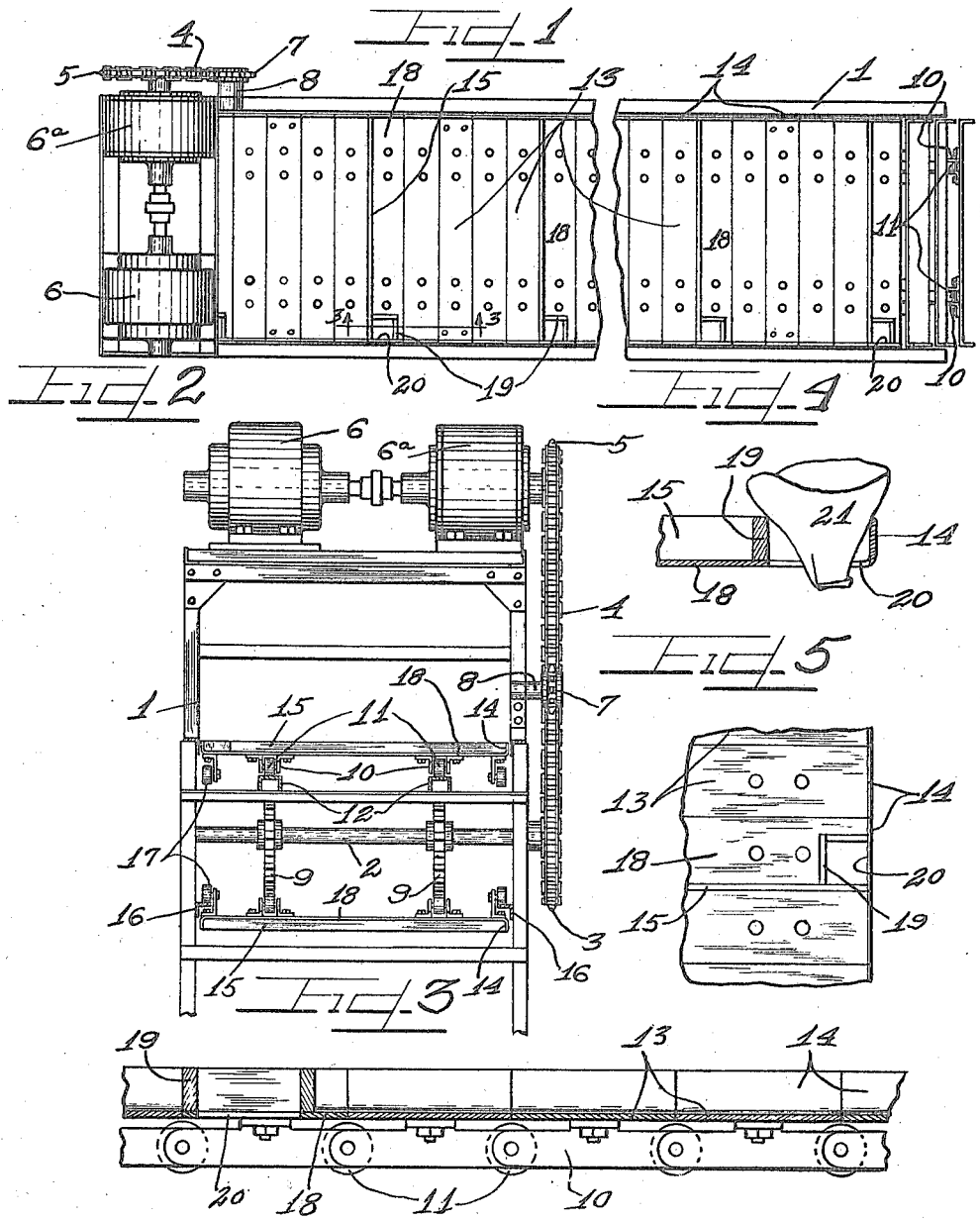

1,445,632

UNITED STATES PATENT OFFICE.

ALVIN O. LUNDELL, OF CHICAGO, ILLINOIS, ASSIGNOR TO THE ALLBRIGHT-NELL CO., OF CHICAGO, ILLINOIS, A CORPORATION OF ILLINOIS.

VISCERA AND HEAD INSPECTION TABLE.

Application filed May 20, 1922. Serial No. 562,560.

*To all whom it may concern:*

Be it known that I, ALVIN O. LUNDELL, a citizen of the United States, and a resident of the city of Chicago, in the county of Cook and State of Illinois, have invented certain new and useful Improvements in a Viscera and Head Inspection Table; and I do hereby declare that the following is a full, clear, and exact description of the same, reference being had to the accompanying drawings, and to the numerals of reference marked thereon, which form a part of this specification.

In the inspection of carcasses it has been found desirable to not only inspect the viscera but also the heads to ascertain whether or not the carcasses are diseased. For this purpose an improved type of an endless inspection table has been provided with separated viscera compartments each of which has associated therewith a head carrying receptacle to permit the head and the viscera removed from a carcass to be associated with each other and carried along for inspection opposite the carcass from which they have been removed.

It is an object of this invention to provide an improved device whereby the viscera and the head of a carcass after being removed are adapted to be carried along for inspection.

A further object of the invention is to provide each of the compartments of a movable inspection table with receptacles adapted to hold the removed heads of carcasses to permit inspection of the same.

Another object of the invention is to provide each of the compartments of a movable inspection table with a holder for carrying the removed head of a carcass along with a viscera removed from the same carcass.

It is an important object of this invention to provide a simple and effective movable endless inspection table wherein the head and the viscera of the same carcass are carried along simultaneously past an inspector to permit him to examine both the head and the viscera, as they are carried along opposite the carcass from which they have been removed.

Other and further important objects of this invention will be apparent from the disclosures in the drawings and specification.

The invention (in a preferred form) is illustrated in the drawings and hereinafter more fully described.

On the drawings:

Figure 1 is a top plan view of an inspection table embodying the principles of this invention.

Figure 2 is an end elevation thereof.

Figure 3 is an enlarged detail section taken on line 3—3 of Figure 1.

Figure 4 is an enlarged cross section of one of the head receptacles showing a head seated therein.

Figure 5 is a top plan view of a fragmentary portion of the conveyor.

As shown on the drawings:

The inspection table comprises a supporting frame 1 having transverse shafts 2 journalled in suitable bearings near the ends of said frame. Keyed or otherwise secured on one projecting end of one of the shafts 2 is a sprocket wheel 3 adapted to be driven by means of an endless chain 4 which is trained around a driving sprocket wheel 5. The sprocket wheel 5 is driven by a motor 6 and a gear set 6ª which are connected together and mounted upon the frame 1 near one end of the table. A sprocket pinion 7 is mounted on a stub shaft 8 supported on the frame 1 in a position to permit the sprocket pinion 7 to tension the chain 4.

Secured on each of the shafts 2 are sprocket wheels 9 around which conveyor chains 10 are trained. The chains 10 are provided with rollers 11 which are adapted to run on guide tracks or rails 12 secured longitudinally on the supporting frame 1. Attached transversely of the chains 10 are a plurality of flat flights, slats or cleats 13 provided at both ends with integral outwardly turned flanges 14. The slats 13 form a movable endless inspection table having compartments formed thereon by means of flanges which are rigidly secured to or integrally formed on certain of said slats 18 to form transverse partitions or plates 15. Parallel guide rails or tracks 16 are mounted on the frame uprights. To support the lower run of the endless inspection table, certain of the slats 13 and 18 have mounted at the ends of the inner surfaces thereof guide rollers 17 which are adapted to track on the rails 16.

The inspection table is divided into compartments each adapted to receive an individual viscera. Formed in one corner of each table compartment is a holder or receptacle 19 adapted to receive and hold the removed head of a carcass. Each holder 19 is provided with a bottom opening 20 to permit the snoot of a removed carcass head 21 to project therethrough as illustrated in Figure 4. The viscera from the same carcass is deposited in the respective compartment of which the head holder forms a part.

The operation is as follows:

The inspection device embraces the endless conveyor or table which is divided into compartments each adapted to receive an individual carcass viscera removed by an eviscerator from a carcass carried along by an overhead conveyor (not shown). The eviscerated viscera is deposited in one of the table compartments opposite the moving carcass from which it has been removed. The eviscerator or other employee also removes the head from the respective carcass and deposits said head in the holder or receptacle 19 mounted in the corner of the compartment carrying the viscera of said carcass.

The viscera and head of a moving carcass are carried along opposite or adjacent the carcass from which they have been removed. The associated viscera and head of a particular carcass are thus carried past an inspector who stands beside the traveling table and inspects not only the viscera but the head as well. If both the viscera and the head are free from disease or other objections, they are passed on to be discharged. If, however, a viscera is found to be diseased, it is tagged as is also the respective head and the carcass. Should the viscera be free from disease, the corresponding head, carried in the compartment head holder 19, is inspected to ascertain whether or not there are any signs of disease in the head. If the head is diseased, it is tagged as are also the respective viscera and the carcass. It will thus be seen that both the viscera and head of a particular carcass are thoroughly inspected before the carcass is permitted to pass as fit for use.

It will of course be understood that the head holders 19 may be of any desired shape or construction and may be mounted in any convenient place in a compartment other than the location shown and described.

I am aware that numerous details of construction may be varied through a wide range without departing from the principles of this invention, and I therefore do not purpose limiting the patent granted otherwise than necessitated by the prior art.

I claim as my invention:

1. The combination with a movable viscera inspecting table, of means thereon for dividing the table into compartments, and head holders on said table in said compartments.

2. An inspection device comprising an endless table, means for driving the same, members on said table for dividing the table into compartments for receiving viscera, and a receptacle for each of said compartments for receiving the removed head of the same carcass from which the viscera in the respective compartment has been removed.

3. The combination with a viscera inspection table, of carcass head holders secured thereon to permit the viscera and the head removed from a particular carcass to be associated with each other for inspection.

4. An inspection device comprising endless chains, means for driving the same, a plurality of flanged slats secured to said chains to form a table, plates secured to certain of said slats to divide the table into viscera receiving compartments, and a carcass head receptacle secured to certain of the slats of each compartment.

5. An inspection device comprising a movable endless table embracing a plurality of transverse slats flanged outwardly at both ends, flanges on certain of said slats to divide the table into viscera compartments, and a head holder secured in each of said compartments and opening through the table to permit the snoot of a removed carcass head to project therethrough.

6. An inspection device comprising a movable endless table embracing a plurality of transverse flights flanged outwardly at both ends, certain of said flights having an opening therein, a partition secured to each of the flights having an opening therein, said partitions dividing the table into compartments, and a head holder around the opening in each of the flights having an opening therein.

7. An inspection device of the class described comprising a movable endless table having openings therein, means for dividing the table into separated compartments so that each compartment will include one of the openings, and a holder in each compartment around the opening therein.

8. The combination with an inspection table divided into viscera receiving compartments, of a head holder in each of said compartments.

9. An inspection table having two sets of compartments, one set disposed within the other, whereby the viscera and heads of carcasses may be associated with one another.

In testimony whereof I have hereunto subscribed my name in the presence of two subscribing witnesses.

ALVIN O. LUNDELL.

Witnesses:
CARLTON HILL.
FRED E. PAESLER.